United States Patent
Yamane et al.

(10) Patent No.: US 10,737,548 B2
(45) Date of Patent: Aug. 11, 2020

(54) INTERIOR MEMBER

(71) Applicant: TOYOTA BOSHOKU KABUSHIKI KAISHA, Aichi-ken (JP)

(72) Inventors: Ryo Yamane, Aichi-ken (JP); Yoshiaki Toumasu, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 84 days.

(21) Appl. No.: 16/134,230

(22) Filed: Sep. 18, 2018

(65) Prior Publication Data
US 2019/0100074 A1 Apr. 4, 2019

(30) Foreign Application Priority Data

Sep. 29, 2017 (JP) ................................ 2017-191181

(51) Int. Cl.
*F24F 3/00* (2006.01)
*B60H 1/00* (2006.01)
*B60R 13/02* (2006.01)
*B60N 2/75* (2018.01)

(52) U.S. Cl.
CPC ..... *B60H 1/00271* (2013.01); *B60H 1/00295* (2019.05); *B60N 2/78* (2018.02); *B60R 13/02* (2013.01); *B60R 13/0243* (2013.01); *B60H 2001/003* (2013.01); *B60R 2013/0287* (2013.01)

(58) Field of Classification Search
CPC ............ B60H 1/00271; B60H 1/00295; B60H 2001/003; B60N 2/78; B60R 13/0243; B60R 2013/0287

USPC ....................................................... 165/202
See application file for complete search history.

(56) References Cited

U.S. PATENT DOCUMENTS 9,923,251 B2 * 3/2018 Rawlinson .......... H01M 10/653

FOREIGN PATENT DOCUMENTS

| EP | 1211167 A | 6/2002 |
| JP | H04007937 U | 1/1992 |
| JP | 2009-106670 A | 5/2009 |

OTHER PUBLICATIONS

European Extended Search Report in related EP Application No. 18189685.3, dated Dec. 20, 2018.

* cited by examiner

*Primary Examiner* — Davis D Hwu
(74) *Attorney, Agent, or Firm* — Greenblum & Bernstein, P.L.C.

(57) ABSTRACT

The interior member includes a base material part and a skin part disposed on one surface side of the base material part. The skin part is provided with an air passage part through which air that is temperature-adjusted to a predetermined temperature passes. The air passage part has a passing resistance member (a knitted fabric part that gives passing resistance to the air passing through the air passage part. Also, the air that is temperature-adjusted may be distributed from air sent out from an air conditioner installed in a vehicle, a building, or the like. Further, examples of the passing resistance member include three-dimensional knitted fabrics (such as a double raschel knitted fabric or a circular knitted fabric) and nonwoven fabrics.

10 Claims, 4 Drawing Sheets

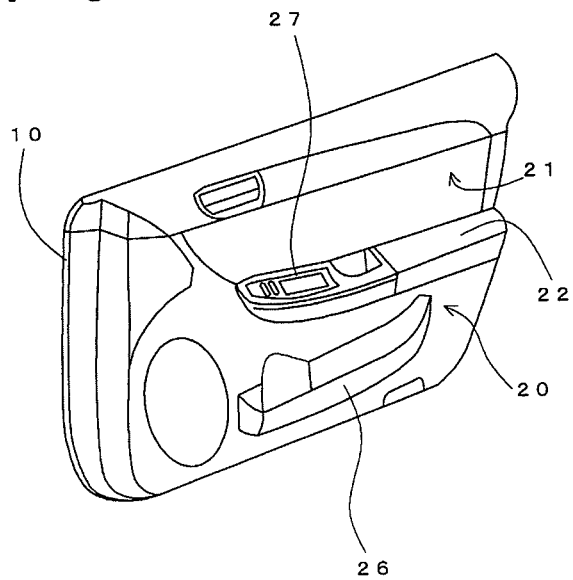
[Fig 1]
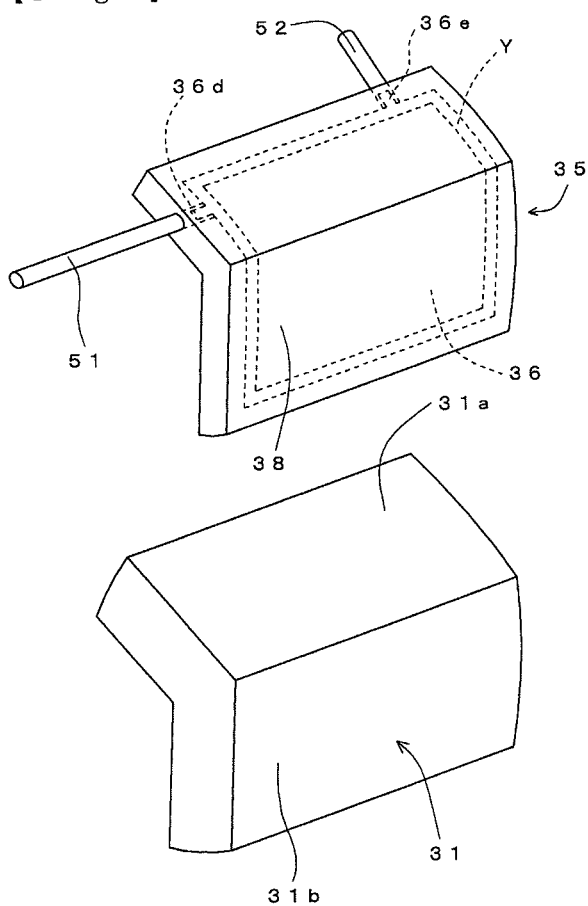
[Fig 2]

[Fig 3]
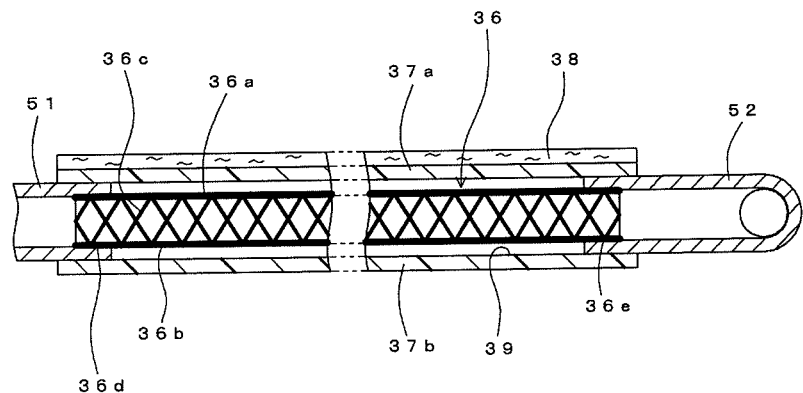
[Fig 4]
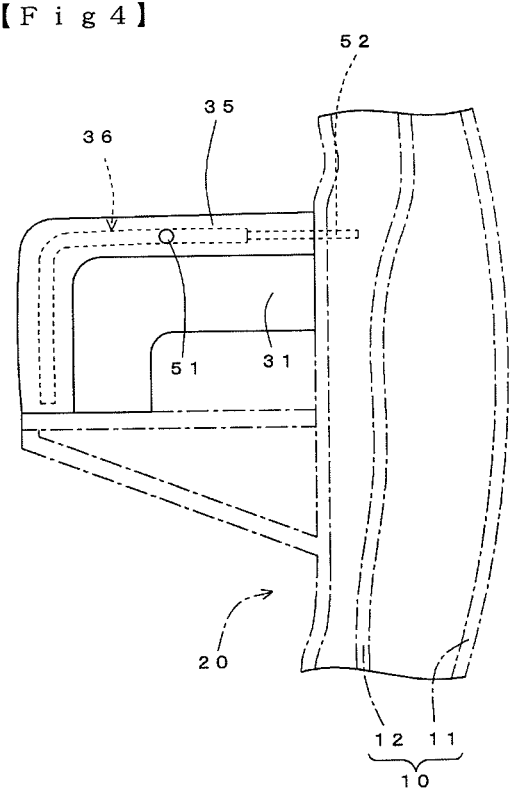

[Fig 5]
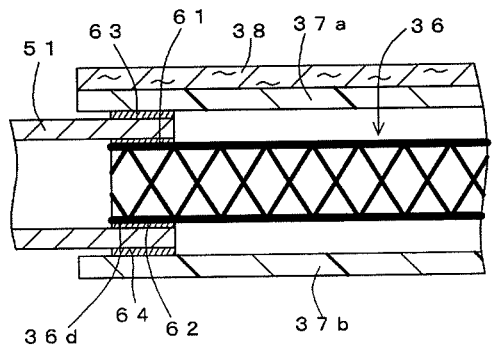
[Fig 6]
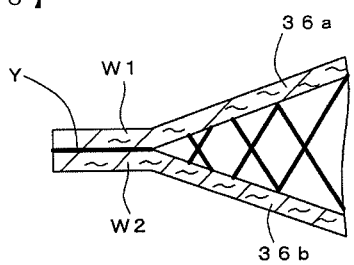
[Fig 7]
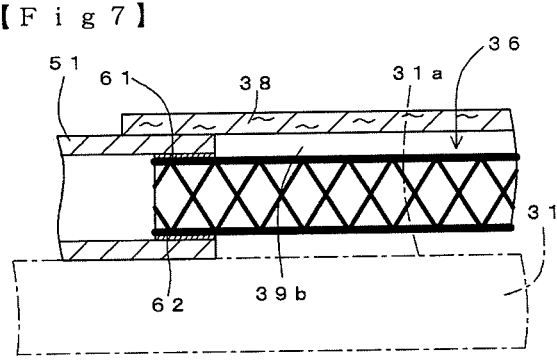

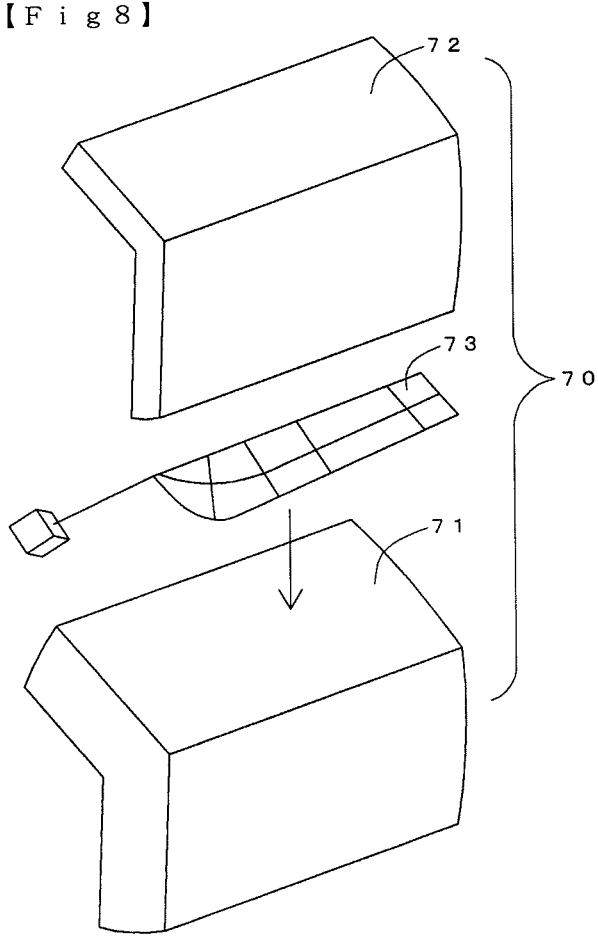
[Fig 8]

INTERIOR MEMBER

The present application claims priority under 35 U.S.C. § 119 of Japanese Application No. 2017-191181 filed on Sep. 29, 2017, the disclosure of which is expressly incorporated by reference herein in its entirety.

BACKGROUND

1. Technical Field

The present invention relates to an interior member. More specifically, the present invention relates to an interior member whose surface can be temperature-adjusted to a comfortable temperature by using air sent out from an air conditioner.

2. Related Art

An interior member, for example, a conventional armrest 70 that is a specific example of an interior member for a vehicle, includes a base material part 71 having a desired shape and a skin part 72 disposed on the surface side of the base material part 71 and constituting a design surface, as shown in FIG. 8. For more comfortable use, it is conceivable that, in such an armrest 70, a heater device (for example, a base cloth provided with a heater wire) 73 is disposed between the base material part 71 and the skin part 72, as shown in FIG. 8, to warm up the armrest 70, thereby improving the feeling of use. Although not shown, Japanese Unexamined Utility Model Application Publication No. H4-7937 discloses a technique of embedding the heater device 73 in the base material part 71 to warm up the armrest 70, thereby improving the feeling of use.

SUMMARY

However, the armrest 70 including this heater device 73 can merely be warmed up by the heater device 73 when the device is in a heat generating state, and cannot be brought to a temperature suitable for the situation at the point of time. In other words, it is possible only to warm up the skin part 72 by using the heater device 73, and thus the armrest 70 cannot provide a feeling of use improved irrespective of the season (also in any seasons other than winter).

The present invention has been made in light of the viewpoint of the above-described related art, and an object thereof is to provide an interior member that can be brought to a temperature suitable for the situation at the point of time.

Means for Solving the Problem

The present invention is as follows.

1. The invention according to claim 1 relates to an interior member comprising: a base material part; and a skin part disposed on one surface side of the base material part, the skin part having an air passage part through which air that is temperature-adjusted to a predetermined temperature passes, the air passage part having a passing resistance member that gives passing resistance to the air passing through the air passage part.

2. The invention according to claim 2 is the invention according to claim 1, wherein the air that is temperature-adjusted is distributed from air sent out from an air conditioner.

3. The invention according to claim 3 is the invention according to claim 1, wherein a pipe for introducing the temperature-adjusted air into the air passage part and a connection part on an air introduction side of the passing resistance member are connected in an airtight state, wherein a pipe for discharging the air having passed through the air passage part to an outside of the air passage part and a connection part on an air discharge side of the passing resistance member are connected in an airtight state, and wherein end edge parts on the air introduction side and the air discharge side, respectively, of the passing resistance member are brought in an airtight state.

4. The invention according to claim 4 is the invention according to claim 2, wherein a pipe for introducing the temperature-adjusted air into the air passage part and a connection part on an air introduction side of the passing resistance member are connected in an airtight state, wherein a pipe for discharging the air having passed through the air passage part to an outside of the air passage part and a connection part on an air discharge side of the passing resistance member are connected in an airtight state, and wherein end edge parts on the air introduction side and the air discharge side, respectively, of the passing resistance member are brought in an airtight state.

5. The invention according to claim 5 is the invention according to claims 1, wherein the passing resistance member is made of a three-dimensional knitted fabric or a nonwoven fabric.

6. The invention according to claim 6 is the invention according to claims 2, wherein the passing resistance member is made of a three-dimensional knitted fabric or a nonwoven fabric.

7. The invention according to claim 7 is the invention according to claims 3, wherein the passing resistance member is made of a three-dimensional knitted fabric or a nonwoven fabric.

8. The invention according to claim 8 is the invention according to claims 4, wherein the passing resistance member is made of a three-dimensional knitted fabric or a nonwoven fabric.

9. The invention according to claim 9 is the invention according to any one of claims 5 to 8, wherein the three-dimensional knitted fabric is a double raschel knitted fabric or a circular knitted fabric.

Effect of the Invention

In the interior member of the present invention, the skin part is provided with the air passage part, and, additionally, the passing resistance member is disposed in the air passage part. Accordingly, the air passing through the air passage part undergoes the passing resistance and passes through the air passage part while staying as appropriate. Therefore, the temperature of the air passing through the air passage part can be more efficiently transmitted to the surface side of the interior member. Since the temperature of the air passing through the air passage part (constituted by the passing resistance member and the like) is adjusted to a predetermined temperature, the temperature of the surface of the interior member can be adjusted to a temperature suitable for the use situation at the point of time. For example, it is possible to make the interior member to be used more comfortable according to the kind of the air that is temperature-adjusted to a predetermined temperature (cold air, warm air or cool air).

In addition, when the temperature-adjusted air is distributed from the air sent out from air conditioners installed in vehicles, buildings, etc., air conditioner devices usually installed in vehicles, buildings, etc., can be effectively used to obtain temperature-adjusted air. Thus, the temperature of the interior member can be adjusted more simply and inexpensively.

Furthermore, when the passing resistance member is connected, in an airtight state, with a pipe for introducing air (air introduction pipe) and a pipe for discharging air (air discharge pipe), and end edge parts on the air introduction side and the air discharge side, respectively, of the passing resistance member are brought in an airtight state, the air leakage from the air passage part to the outside can be prevented.

In addition, when the passing resistance member is made of a three-dimensional knitted fabric (a double raschel knitted fabric, a circular knitted fabric, or the like) or a nonwoven fabric, it is possible to surely give the passing resistance to the air passage part with a simple structure and to form a skin part having sufficient cushioning property.

BRIEF DESCRIPTION OF DRAWINGS

FIG. 1 is a perspective view of a door provided with a door trim (a specific example of an interior member for a vehicle) according to Embodiment 1.

FIG. 2 is an exploded perspective view of an armrest constituting a part of the door trim shown in FIG. 1.

FIG. 3 is a longitudinal sectional view of a skin part and the like constituting the armrest shown in FIG. 2.

FIG. 4 is a schematic longitudinal sectional view of the door trim and a door panel.

FIG. 5 is a schematic longitudinal sectional view for explaining a welded part on the side of an air introduction pipe of Embodiment 1.

FIG. 6 is a schematic longitudinal sectional view for explaining a welded part at an end edge part of a passing resistance member of Embodiment 1.

FIG. 7 is a schematic longitudinal sectional view for explaining a skin part of Embodiment 2.

FIG. 8 is an exploded perspective view of an armrest according to a conventional example.

DETAILED DESCRIPTION

Hereinafter, the present invention will be described in detail with reference to the drawings.

The particulars described herein are given by way of example and for the purpose of illustrative discussion of the embodiments of the present invention, and are presented for the purpose of providing what is believed to be the description from which the principles and conceptual features of the present invention can be most effectively and readily understood. In this regard, no attempt is made to show structural details of the present invention in more detail than is necessary for the fundamental understanding of the present invention, and the description is taken with the drawings making apparent to those skilled in the art how several forms of the present invention may be embodied in practice.

In the present embodiment, a specific aspect in which the present invention is applied to a part (for example, an armrest 22 in FIG. 1) of an interior member (for example, a vehicle door trim 20 in FIG. 1) will be described. As shown in FIGS. 1 and 2, in the present embodiment, the vehicle door trim 20, which is an interior member, is provided with the armrest 22. The armrest 22 is provided with a base material part 31 and a skin part 35 laminated on the surface (one surface) of the base material part 31.

(1) Base Material Part

The base material part 31 is a member that defines the outer shape of the armrest 22, and is made of a material having appropriate cushioning property and form stability. As the material constituting the base material part 31, synthetic resin foam can be exemplified. In this case, the type of the synthetic resin is not particularly limited, and examples thereof include polyurethane resins and polyolefin resins such as polyethylene and polypropylene.

(2) Skin Part

As shown in FIGS. 2 and 3, the skin part 35 includes a knitted fabric part 36, which is an example of a passing resistance member that gives passing resistance to air, two air permeability blocking sheets 37a, 37b, and a skin sheet 38 constituting a design surface. The two air permeability blocking sheets 37a, 37b are arranged in parallel to one surface side and the other surface side of the knitted fabric part 36, which is an example of the passing resistance member, and an air passage part 39 is constituted by the knitted fabric part 36 and a small space formed between the knitted fabric part 36 and the air permeability blocking sheets 37a, 37b. In the case where the skin sheet 38 is made of a material having no air permeability, such as synthetic leather, the air permeability blocking sheets 37a, 37b do not have to be provided.

The type of the knitted fabric constituting the knitted fabric part 36 is not particularly limited, but a bulky knitted fabric such as a three-dimensional knitted fabric, jersey, or tricot is preferable, and a three-dimensional knit fabric is more preferable. Examples of this three-dimensional knitted fabric include those having a structure in which a knitted fabric 36a on one surface side and a knitted fabric 36b on the other surface side are coupled by a binding yarn 36c (see FIG. 3). Examples of this three-dimensional knitted fabric include a double raschel knitted fabric knitted by a double raschel knitting machine and a circular knitted fabric knitted by a circular knitting machine. As the passing resistance member disposed in the skin part 35, a double raschel knitted fabric is preferable.

Constituent yarns used for forming the knitted fabric 36a on one surface side and the knitted fabric 36b on the other surface side may each be any of synthetic fibers, recycled fibers, natural fibers, and the like. Further, the constituent yarn may be a yarn made up of only one type of fiber, or may be a yarn produced by mixing a plurality of fibers. Further, it may be an uncolored yarn with the color tone of the fiber as it is, or may be a yarn colored to a predetermined color tone. Further, the knitted fabric 36a on one surface side and the knitted fabric 36b on the other surface side may be formed of the same type of yarn, or may be formed of different types of yarns.

Specific examples of the fiber include thermoplastic resin fibers including polyester fibers such as polyethylene terephthalate fiber, polybutylene terephthalate fiber, and polytrimethylene terephthalate fiber; polyamide fibers such as nylon 6 fiber and nylon 66 fiber; polyacrylic fibers; and polyolefin fibers such as polyethylene fiber and polypropylene fiber. Further, other synthetic fibers excluding thermoplastic resin fibers, natural fibers such as cotton, hemp, silk, and wool, and regenerated fibers such as cupra rayon, viscose rayon, and lyocell can be exemplified. Among these fibers, synthetic fibers are preferable, thermoplastic resin fibers are more preferable, and polyester fibers having high strength and excellent durability are still more preferable.

The form of the constituent yarn is also not particularly limited, and the constituent yarn may be either a filament yarn or a spun yarn. Further, the constituent yarn may be a bulky textured yarn such as a twisted yarn, a false twisted yarn, or a fluid jet textured yarn. In the case of a filament yarn, it may be either a multifilament or a monofilament, but is preferably a multifilament.

The finenesses of the constituent yarns constituting the knitted fabric 36a on one surface side and the knitted fabric 36b on the other surface side are not particularly limited, but are each preferably from 50 to 1500 dtex, more preferably from 150 to 1200 dtex. A three-dimensional knitted fabric having sufficient cushioning property can be knitted as long as the finenesses of the constituent yarns each fall within the above range. The finenesses of the constituent yarns constituting the knitted fabric 36a on one surface side and the knitted fabric 36b on the other surface side may be the same or different.

Furthermore, the yarn densities of the knitted fabric 36a on one surface side and the knitted fabric 36b on the other surface side are also not particularly limited, but the yarn densities thereof in the course direction are each preferably from 10 to 100 yarns/inch, more preferably from 15 to 70 yarns/inch, and the yarn densities thereof in the wale direction each are preferably from 5 to 50 yarns/inch, more preferably from 8 to 30 yarns/inch. When these yarn densities fall within the above ranges, a three-dimensional knitted fabric having sufficient cushioning property can be knitted. In addition, the yarn densities of the knitted fabric 36a on one surface side and the knitted fabric 36b on the other surface side may be the same or different.

Further, a filament yarn is usually used as the binding yarn 36c. This filament yarn may be either a multifilament or a monofilament, and may be textured, for example, false twisted. When the binding yarn 36c is a multifilament, a more flexible knitted fabric part 36 can be obtained, and a passing resistance member having higher air passing resistance can be obtained. On the other hand, when the binding yarn 36c is a monofilament, the flexibility is somewhat reduced, and the air passing resistance of the passing resistance member is low. Which filament yarn is used can be selected depending on the comfortable temperature and feel of the armrest 22. The type of the fibers constituting the filament yarn is not particularly limited, and the fibers may be any of synthetic fibers, recycled fibers, natural fibers, and the like.

Specific examples of the fibers constituting the filament yarn include thermoplastic resin fibers including polyester fibers such as polyethylene terephthalate fiber and polybutylene terephthalate fiber; polyamide fibers such as nylon 6 fiber and nylon 66 fiber; polyacryl fibers; and polyolefin fibers such as polypropylene fiber, synthetic fibers other than the thermoplastic resin fibers, natural fibers, and regenerated fibers. Of these fibers, synthetic fibers are preferable, thermoplastic resin fibers are more preferable, and polyester fibers having high strength, excellent durability and the like, particularly polyethylene terephthalate fibers, are still more preferable.

The fineness of the binding yarn 36c is not particularly limited, but is preferably from 10 to 1500 dtex, more preferably from 20 to 1000 dtex. When the fineness falls within the above range, a three-dimensional knit fabric having sufficient cushioning property can be knitted. The yarn density of the binding yarn 36c is not particularly limited, but the yarn density thereof in the course direction is preferably from 10 to 100 yarns/inch, more preferably from 15 to 70 yarns/inch, and the yarn density thereof in the wale direction is preferably from 5 to 50 yarns/inch, still more preferably from 8 to 30 fibers/inch. When the yarn densities fall within the above ranges, a three-dimensional knit fabric having sufficient cushioning property can be knitted.

The knitted fabric part 36 as the passing resistance member has been described in detail above. Additionally, examples of the passing resistance member include members made of fabrics such as a nonwoven fabric and a woven fabric and foamed resin sheets such as polyurethane resin foam and polyolefin resin foam. Among these, a knitted fabric, particularly a three-dimensional knitted fabric, is preferable from the viewpoint of the comfortable temperature and feel of the armrest 22.

The skin sheet 38 is disposed on one surface side of the one air permeability blocking sheet 37a, and constitutes a design surface of the armrest 22. As the skin sheet 38, a skin material such as a design cloth (fabric), a resin layer (a polyurethane resin layer, a polypropylene resin layer, etc.), synthetic leather, artificial leather, natural leather, and the like can be used. Further, the method of disposing the skin sheet 38 on one surface side of the base material part 31 is not particularly limited, and methods such as adhesion via an adhesive or the like and thermal fusion are used depending on the material for the skin sheet 38.

(3) Use of Interior Member

The use of the interior member of the present invention is not particularly limited, and examples thereof include interior members for vehicles and interior members for buildings. Examples of the vehicle include railway vehicles, construction vehicles, agricultural vehicles, and industrial vehicles, in addition to passenger cars, buses, trucks, and the like. In addition, the interior member can be used, particularly, as a ceiling, a door trim, an instrument panel, a pillar, a sun visor, or a package tray, of a passenger car, a bus, or a truck.

Hereinafter, the present invention will be described in detail by illustrating specific embodiments.

Embodiment 1

As shown in FIGS. 1 and 4, a door trim 20, which is an interior member of Embodiment 1, is attached to the vehicle compartment side of a door panel 10. Here, the door panel 10 includes a door outer panel 11 and a door inner panel 12. The door trim 20 includes an ornament 21, an armrest 22, a door pocket 26, a switch panel 27, and the like. The armrest 22 is an interior member having the features of the present invention, and includes a base material part 31 and a temperature-adjustable skin part 35 (see FIGS. 2 and 4).

As shown in FIG. 2, the base material part 31 is a member that defines the outer shape of the armrest 22, and is configured by arranging an upper face part 31a and a side face part 31b in an L shape. The base material part 31 is made of a material having moderate cushioning property and form stability. Also, resin foam such as foamed polyurethane is frequently used as the material constituting the base material part 31.

As shown in FIG. 3, the skin part 35 includes a knitted fabric part 36, air permeability blocking sheets 37a, 37b, and a skin sheet 38. Among them, the skin sheet 38 is a member constituting a design surface of the armrest 22, and this skin sheet 38 is made of an air permeable material such as a design cloth (fabric). Even though the skin sheet 38 has air permeability in this manner, the air does not leak to the outside because of the presence of the air permeability blocking sheets 37a, 37b.

Further, the method of disposing the skin part 35 on one surface side of the base material part 31 is not particularly limited, and the skin part 35 is disposed thereon by methods such as adhesion via an adhesive or the like and thermal fusion depending on the material for the air permeability blocking sheet 37b. Further, the two air permeability blocking sheets 37a, 37b are arranged in parallel with the knitted fabric part 36 being held therebetween, and an air passage part 39 is constituted by a small space between the knitted fabric part 36 and the air permeability blocking sheets 37a, 37b. Further, the knitted fabric part 36 disposed in the air passage part 39 serves as a passing resistance member.

The knitted fabric part 36 is a three-dimensional knitted fabric, and includes a knitted fabric 36a on one surface side, a knitted fabric 36b on the other surface side, and a binding yarn 36c for coupling the knitted fabrics 36a, 36b. Further, the skin part 35 is disposed on one surface side of the base material part 31, whereby the knitted fabric part 36 is also bent along the outer shape of the base material part 31 (see the broken line in FIG. 2). Further, in the knitted fabric part 36, connection parts 36d, 36e are provided on the side where air is introduced and the side where air is discharged. An end part of an air introduction pipe 51 is connected to the connection part 36d on the side where air is introduced, and an end part of an air discharge pipe 52 is connected to the connection part 36e on the side where air is discharged (see FIG. 3).

In addition, as shown in FIG. 5, the connection part 36d and the air introduction pipe 51 are ultrasonically welded (welded) to be in an airtight state (see the welded parts 61 and 62). Further, the connection part 36e and the air discharge pipe 52 (see FIG. 3) are similarly ultrasonically welded (welded) to be in an airtight state, though not shown. Further, as shown in FIG. 6, other portions of end edge parts (W1, W2) of the knitted fabric part 36 than the connection parts 36d, 36e are also ultrasonically welded (welded) to be in an airtight state. Specifically, the portion W1 constituting the end edge part of the knitted fabric 36a on one surface side and the portion W2 constituting the end edge part of the knitted fabric 36b on the other surface side are superimposed and ultrasonically welded (welded) (see a welded part Y) to be in an airtight state.

Further, as shown in FIG. 3, the surfaces on one surface side and the other surface side of the knitted fabric part 36 (upper and lower surfaces in the portion arranged along the upper face part 31a of the base material part 31, and front and rear surfaces along the vehicle width direction in the portion arranged along the side face part 31b) are covered with the air permeability blocking sheets 37a, 37b, respectively. Similarly to welded parts 63, 64 in FIG. 5, the air permeability blocking sheets 37a, 37b and the corresponding pipes (see the air introduction pipe 51 and air discharge pipe 52 in FIG. 3) are also ultrasonically welded (welded) to be in an airtight state. Therefore, the air leakage from the knitted fabric part 36 toward the skin sheet 38 is prevented.

Here, the air introduction pipe 51 is constituted by a branch pipe that branches from a pipe (duct pipe) connecting a main body part for adjusting the temperature of the air of an air conditioner for a vehicle and a duct for blowing out the temperature-adjusted air into a vehicle compartment. Further, as shown in FIG. 4, the air discharge pipe 52 is arranged toward the outside of the vehicle compartment, and air is discharged toward the door panel 10.

In the armrest 22 of Embodiment 1, the skin part 35 is provided with the air passage part 39, and the knitted fabric part 36 (passing resistance member) is disposed in the air passage part 39. Therefore, the air passing through the air passage part 39 undergoes passing resistance in the knitted fabric part 36, so that the passing speed is appropriately lowered. In this manner, the air introduced from the air introduction pipe 51 passes through the knitted fabric part 36 at a moderate speed from the connection part 36d toward the connection part 36e. As a result, the temperature of the air passing through the air passage part 39 can be more efficiently transmitted to the surface side of the armrest 22.

Since the temperature of the air passing through the air passage part 39 is adjusted to an appropriate temperature, based on the temperature adjusting function of the air conditioner, the temperature of the surface of the armrest 22 can be adjusted to an appropriate temperature corresponding to the temperature in the vehicle compartment at the point of time. For example, the temperature-adjusted air can cool down the armrest 22 when being cold air, and can warm up the armrest 22 when being warm air. In addition, when the temperature-adjusted air is cool air, the passenger who is in contact with the armrest 22 can receive a comfortable feel. Therefore, Embodiment 1 can make the armrest 22 to be used more comfortable for the passenger.

Further, in Embodiment 1, the air sent out from the air conditioner for the vehicle is distributed and used as the temperature-adjusted air, the facilities usually provided in a vehicle can be effectively used, and the temperature-adjusted air can be used. Therefore, the temperature of the armrest 22 can be adjusted more simply and inexpensively.

Further, the passing resistance member is connected, in an airtight state, with the pipes 51 and 52 for air introduction and air discharge, respectively, and the end edge parts of the passing resistance member are also brought in an airtight state. Further, the surfaces on one surface side and the other surface side of the knitted fabric part 36 are covered with the air permeability blocking sheets 37a, 37b. Therefore, air is prevented from leaking out from the surface and side surface of the armrest 22. Since required parts are made airtight and air leakage from the surface and the like is also prevented in this manner, the air sent out from the air conditioner for a vehicle can be utilized extremely effectively.

In addition, since the knitted fabric part 36 is made of a knitted fabric knitted by a raschel knitting machine and including the two knitted fabrics 36a and 36b layered on one surface side and the other surface side thereof that are coupled by the binding yarn 36c, the knitted fabric part 36 has a simple structure and can reliably develop the passing resistance. In addition, the knitted fabric part 36 is a three-dimensional knitted fabric, and thus can impart sufficient cushioning property to the armrest 22.

Embodiment 2

As shown in FIG. 7, an armrest 22 of Embodiment 2 is different from the armrest 22 of Embodiment 1 in that (a) the armrest 22 of Embodiment 2 includes no air permeability blocking sheet 37a or 37b; that (b) an air passage part 39b is constituted by a space formed between a skin sheet 38 and an upper surface part 31a of a base material part 31; and that (c) the skin sheet 38 is limited to one having air permeability despite the fact that armrest 22 includes no air permeability blocking sheet 37a or 37b [the skin sheet 38 is made of, for example, a design cloth (fabric)].

The armrest 22 of Embodiment 2 includes no air permeability blocking sheet 37a or 37b, and the skin sheet 38 has air permeability. Accordingly, the following operational effects are obtained in addition to the effects of Embodiment 1. That is, the air passing through the air passage part 39b leaks out from the skin sheet 38 into the vehicle compartment, and the leaked air comes in contact with a passenger. For a passenger who feels comfortable upon direct contact with the temperature-adjusted air, the atmosphere in the vehicle compartment is made more comfortable.

The present invention is not limited to the above-described embodiments, and can be variously modified within the scope of the present invention depending on the purpose and use. For example, in Embodiments 1 and 2, the discharge port of the air discharge pipe 52 is oriented in the direction from the vehicle compartment side to the door panel 10. However, this discharge port may also be oriented in the direction toward the inside of the vehicle compartment (for example, the direction toward the passenger on the rear seat). The number of the discharge ports is not particularly limited, and may be one, or two or more. In this case, the temperature-adjusted air may be discharged toward the upper, lower, front, and rear sides in the vehicle compartment by setting the orientations of the discharge ports in different directions.

In addition, there has been illustrated an aspect in which the temperature-controlled air is sent out to the knitted fabric part 36 by the branch pipe that branches from the duct pipe for connecting the main body part for adjusting the temperature of the air of the air conditioner for a vehicle and the duct for blowing out the temperature-adjusted air into the vehicle compartment, in each of the embodiments. On the other hand, unlike these embodiments, it is also possible to use a pipe that directly connects the main body part of the air conditioner and the knitted fabric part 36.

It should be noted that the above description is merely for the purpose of explanation and is not to be construed as limiting the present invention. While the present invention has been described with reference to exemplary embodiments, it is to be understood that the phraseology used in the description and illustration of the invention is intended to be illustrative and exemplary rather than restrictive. Modifications within the scope of the appended claims are possible without departing from the scope or spirit of the invention in its form as detailed herein. Although the present invention has been described in detail herein with reference to particular structures, materials and embodiments, the present invention is not intended to be limited to the particulars disclosed herein; rather, the present invention shall cover all functionally equivalent structures, methods and uses within the scope of the appended claims.

INDUSTRIAL APPLICABILITY

The present invention can be used in the technical field of interior members, for example, an interior member for a vehicle in which the surface temperature can be adjusted to a temperature suitable for the use situation at the point of time.

What is claimed is:

1. An interior member comprising:
a base material part; and
a skin part disposed on one surface side of the base material part,
the skin part having an air passage part through which air that is temperature-adjusted to a predetermined temperature passes, and
the air passage part having a passing resistance member that gives passing resistance to the air passing through the air passage part,
wherein a pipe for introducing the temperature-adjusted air into the air passage part and a connection part on an air introduction side of the passing resistance member are connected in an airtight state,
wherein a pipe for discharging the air having passed through the air passage part to an outside of the air passage part and a connection part on an air discharge side of the passing resistance member are connected in an airtight state, and
wherein end edge parts on the air introduction side and the air discharge side, respectively, of the passing resistance member are brought in an airtight state.

2. An interior member comprising:
a base material part; and
a skin part disposed on one surface side of the base material part,
the skin part having an air passage part through which air that is temperature-adjusted to a predetermined temperature passes, and
the air passage part having a passing resistance member that gives passing resistance to the air passing through the air passage part,
wherein the air that is temperature-adjusted is distributed from air sent out from an air conditioner,
wherein a pipe for introducing the temperature-adjusted air into the air passage part and a connection part on an air introduction side of the passing resistance member are connected in an airtight state,
wherein a pipe for discharging the air having passed through the air passage part to an outside of the air passage part and a connection part on an air discharge side of the passing resistance member are connected in an airtight state, and
wherein end edge parts on the air introduction side and the air discharge side, respectively, of the passing resistance member are brought in an airtight state.

3. An interior member comprising:
a base material part; and
a skin part disposed on one surface side of the base material part,
the skin part having an air passage part through which air that is temperature-adjusted to a predetermined temperature passes, and
the air passage part having a passing resistance member that gives passing resistance to the air passing through the air passage part,
wherein the passing resistance member is made of a three-dimensional knitted fabric or a nonwoven fabric.

4. An interior member comprising:
a base material part; and
a skin part disposed on one surface side of the base material part,
the skin part having an air passage part through which air that is temperature-adjusted to a predetermined temperature passes, and
the air passage part having a passing resistance member that gives passing resistance to the air passing through the air passage part,
wherein the air that is temperature-adjusted is distributed from air sent out from an air conditioner,
wherein the passing resistance member is made of a three-dimensional knitted fabric or a nonwoven fabric.

5. The interior member according to claim 1, wherein the passing resistance member is made of a three-dimensional knitted fabric or a nonwoven fabric.

6. The interior member according to claim 2, wherein the passing resistance member is made of a three-dimensional knitted fabric or a nonwoven fabric.

7. The interior member according to claim 3, wherein the three-dimensional knitted fabric is a double raschel knitted fabric or a circular knitted fabric.

8. The interior member according to claim 4, wherein the three-dimensional knitted fabric is a double raschel knitted fabric or a circular knitted fabric.

9. The interior member according to claim 5, wherein the three-dimensional knitted fabric is a double raschel knitted fabric or a circular knitted fabric.

10. The interior member according to claim 6, wherein the three-dimensional knitted fabric is a double raschel knitted fabric or a circular knitted fabric.

* * * * *